(12) United States Patent
Todd et al.

(10) Patent No.: US 11,037,208 B1
(45) Date of Patent: Jun. 15, 2021

(54) ECONOMIC VALUATION OF DATA ASSETS

(71) Applicant: EMC IP Holding Company LLC, Hopkinton, MA (US)

(72) Inventors: Stephen Todd, Shrewsbury, MA (US); Anand Singh, Westborough, MA (US); Sudhir Vijendra, Westborough, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 403 days.

(21) Appl. No.: 15/381,251

(22) Filed: Dec. 16, 2016

(51) Int. Cl.
*G06Q 30/02* (2012.01)

(52) U.S. Cl.
CPC ................ *G06Q 30/0278* (2013.01)

(58) Field of Classification Search
CPC ................................ G06Q 30/0278
See application file for complete search history.

(56) References Cited

U.S. PATENT DOCUMENTS

| | | |
|---|---|---|
| 6,715,145 B1 | 3/2004 | Bowman-Amuah |
| 6,957,227 B2 | 10/2005 | Fogel et al. |
| 7,574,426 B1 | 8/2009 | Ortega |
| 7,580,848 B2 | 8/2009 | Eder |
| 7,752,195 B1 | 7/2010 | Hohwald et al. |
| 7,890,451 B2 | 2/2011 | Cancel et al. |
| 7,970,729 B2 | 6/2011 | Cozzi |
| 8,561,012 B1 | 10/2013 | Holler et al. |
| 9,262,451 B1 | 2/2016 | Singh et al. |
| 9,384,226 B1 | 7/2016 | Goel et al. |
| 9,465,825 B2 | 10/2016 | Nelke et al. |
| 9,606,828 B2 | 3/2017 | Ghosh et al. |
| 9,851,997 B2 | 12/2017 | Gough et al. |
| 2001/0042062 A1 | 11/2001 | Tenev et al. |
| 2002/0169658 A1* | 11/2002 | Adler ............... G06Q 10/06 705/7.28 |
| 2004/0088239 A1* | 5/2004 | Eder ............... G06Q 10/04 705/36 R |
| 2004/0122646 A1 | 6/2004 | Colossi et al. |
| 2005/0182739 A1 | 8/2005 | Dasu et al. |
| 2005/0209942 A1* | 9/2005 | Ballow .............. G06Q 40/06 705/35 |
| 2005/0234815 A1* | 10/2005 | Martin .............. G06Q 10/04 705/39 |

(Continued)

OTHER PUBLICATIONS

U.S. Appl. No. 14/863,783 filed in the name of Stephen Todd et al. on Sep. 24, 2015 and entitled "Unstructured Data Valuation."

(Continued)

*Primary Examiner* — Mark D Featherstone
*Assistant Examiner* — Tony Wu
(74) *Attorney, Agent, or Firm* — Ryan, Mason & Lewis, LLP

(57) ABSTRACT

One or more data assets associated with a data repository of a given enterprise is identified. Each of the one or more data assets is tagged with economic driver metadata that links each of the one or more data assets to at least one economic driver category from a plurality of economic driver categories associated with the given enterprise. At least one economic value is calculated for each of the one or more data assets based on the at least one economic driver category linked to each of the one or more data assets. Calculated economic values for the one or more data assets are stored in a valuation data structure.

20 Claims, 7 Drawing Sheets

(56) References Cited

U.S. PATENT DOCUMENTS

| | | | |
|---|---|---|---|
| 2006/0173873 A1* | 8/2006 | Prompt | G06F 16/284 |
| 2007/0005383 A1 | 1/2007 | Kasower | |
| 2009/0018996 A1 | 1/2009 | Hunt et al. | |
| 2009/0282089 A1 | 11/2009 | Lakshmanachar et al. | |
| 2009/0327257 A1* | 12/2009 | Abouzeid | G06F 16/283 |
| 2009/0327921 A1 | 12/2009 | Holm-Peterson et al. | |
| 2010/0094685 A1 | 4/2010 | Young | |
| 2010/0153324 A1 | 6/2010 | Downs et al. | |
| 2011/0040636 A1* | 2/2011 | Simmons | G06Q 30/02 705/14.71 |
| 2011/0055699 A1 | 3/2011 | Li et al. | |
| 2011/0078603 A1 | 3/2011 | Koomullil | |
| 2011/0153508 A1* | 6/2011 | Jhunjhunwala | G06Q 30/02 705/306 |
| 2012/0084261 A1 | 4/2012 | Parab | |
| 2012/0116911 A1 | 5/2012 | Irving et al. | |
| 2012/0123994 A1 | 5/2012 | Lowry et al. | |
| 2012/0310684 A1 | 12/2012 | Carter | |
| 2012/0323643 A1 | 12/2012 | Bice et al. | |
| 2013/0036091 A1 | 2/2013 | Provenzano et al. | |
| 2013/0055042 A1 | 2/2013 | Al Za'noun et al. | |
| 2013/0073594 A1 | 3/2013 | Jugulum et al. | |
| 2013/0110842 A1 | 5/2013 | Donneau-Golencer et al. | |
| 2013/0151423 A1 | 6/2013 | Schmidt et al. | |
| 2013/0282442 A1* | 10/2013 | Alderman | G06Q 10/0637 705/7.36 |
| 2014/0052489 A1 | 2/2014 | Prieto | |
| 2014/0324856 A1 | 10/2014 | Lahiani et al. | |
| 2015/0120555 A1 | 4/2015 | Jung et al. | |
| 2015/0134591 A1 | 5/2015 | Staeben et al. | |
| 2015/0293974 A1 | 10/2015 | Loo | |
| 2016/0055184 A1 | 2/2016 | Fokoue-Nkoutche et al. | |
| 2016/0110819 A1 | 4/2016 | Abramowitz | |
| 2016/0196311 A1 | 7/2016 | Wang et al. | |
| 2016/0224430 A1 | 8/2016 | Long et al. | |
| 2017/0236060 A1 | 8/2017 | Ignatyev | |
| 2017/0293655 A1 | 10/2017 | Ananthanarayanan et al. | |
| 2018/0082030 A1* | 3/2018 | Allen | G16H 40/20 |

OTHER PUBLICATIONS

U.S. Appl. No. 14/998,112 filed in the name of Stephen Todd et al. on Dec. 24, 2015 and entitled "Data Valuation Based on Development and Deployment Velocity."

U.S. Appl. No. 14/973,096 filed in the name of Stephen Todd et al. on Dec. 17, 2015 and entitled "Data Set Valuation for Service Providers."

U.S. Appl. No. 14/973,141 filed in the name of Stephen Todd et al. on Dec. 17, 2015 and entitled "Automated Data Set Valuation and Protection."

U.S. Appl. No. 14/973,178 filed in the name of Stephen Todd on Dec. 17, 2015 and entitled "Timeliness Metrics and Data Valuation in Distributed Storage Systems."

U.S. Appl. No. 15/073,741 filed in the name of Stephen Todd et al. on Mar. 18, 2016 and entitled "Data Quality Computation for Use in Data Set Valuation."

U.S. Appl. No. 15/072,557 filed in the name of Stephen Todd et al. on Mar. 17, 2016 and entitled "Metadata-Based Data Valuation."

U.S. Appl. No. 15/136,327 filed in the name of Stephen Todd et al. on Apr. 22, 2016 and entitled "Calculating Data Value Via Data Protection Analytics."

U.S. Appl. No. 15/135,790 filed in the name of Stephen Todd et al. on Apr. 22, 2016 and entitled "Data Valuation at Content Ingest."

U.S. Appl. No. 15/135,817 filed in the name of Stephen Todd et al. on Apr. 22, 2016 and entitled "Data Value Structures."

U.S. Appl. No. 15/236,684 filed in the name of Stephen Todd on Aug. 15, 2016 and entitled "Calculating Data Relevance for Valuation."

U.S. Appl. No. 15/353,947 filed in the name of Stephen Todd on Nov. 17, 2016 and entitled "Embedded Data Valuation and Metadata Binding."

U.S. Appl. No. 13/923,791 filed in the name of Stephen Todd et al. on Jun. 21, 2013 and entitled "Data Analytics Computing Resource Provisioning."

U.S. Appl. No. 14/744,886 filed in the name of Marina Zeldin et al. on Jun. 19, 2015 and entitled "Infrastructure Trust Index."

Wikipedia, "Value Chain," https://en.wikipedia.org/w/index.php?title=Value_chain&printable=yes, Jun. 6, 2016, 7 pages.

Doug Laney, "The Economics of Information Assets," The Center for Infonomics, http://www.smarter-companies.com/group/icpractitioners/forum/topics/abstract-and-slides-for-today-s-session-on-infonomics-by-doug, Sep. 13, 2011, 22 pages.

Nicole Laskowski, "Six Ways to Measure the Value of Your Information Assets," Tech Target, http://searchcio.techtarget.com/feature/Six-ways-to-measure-the-value-of-your-information-assets?vgnextfmt=print, May 8, 2014, 3 pages.

R. Shumway et al., "White Paper: Infonomics in Practice: Realizing the True Value of Business Data," Cicero Group, http://cicerogroup.com/app/uploads/2015/09/Infonomics-in-Practice.pdf, 2015, 4 pages.

E. Kupiainen et al., "Why Are Industrial Agile Teams Using Metrics and How Do They Use Them?" Proceedings of the 5th International Workshop on Emerging Trends in Software Metrics, Jun. 2014, 7 pages.

D. Hartmann et al., "Appropriate Agile Measurement: Using Metrics and Diagnostics to Deliver Business Value," Proceedings of the Conference on Agile, Jul. 2006, 6 pages.

T. Lehtonen et al., "Defining Metrics for Continuous Delivery and Deployment Pipeline," Proceedings of the 14th Symposium on Programming Languages and Software Tools, Oct. 2015, 16 pages.

* cited by examiner

| | ECONOMIC VALUE OF DATA ||||
|---|---|---|---|---|
| | NETWORTH OF COMPANY: $110B ||||
| | INTANGIBLE (DATA) WORTH: $50B ||||
| | WORTH | PERCENTAGE WORTH | RRDs | SUB-CATEGORY (SUB-RRDs) |
| TANGIBLE WORTH: $60B | $12.5B | 25% | FINANCIAL | REVENUE (15%)<br>BOOKINGS (35%)<br>FORECASTS (35%)<br>TAX (15%) |
| | $12.5B | 25% | SALES | CUSTOMERS<br>OPPORTUNITIES<br>CUSTOMER SECRETS |
| | $10B | 20% | HR | EMPLOYEES<br>CONTRACTORS<br>SKILLSETS<br>RECRUITMENT |
| | $7.5B | 15% | BUSINESS OPERATIONS | GO TO MARKET<br>STAFFING<br>ENGINEERING |
| | $2.5B | 5% | COMPLIANCE | FEDERAL<br>COUNTRY REGULATIONS<br>SOX<br>PCI |
| | $2.5B | 5% | PRODUCT | SOURCE CODE<br>FEATURES<br>COMPETITION |
| | $2.5B | 5% | MARKETING | BRANDING<br>EVENTS<br>ANNOUNCEMENTS |

300

400

| WEIGHT | MULTIPLIER |
|---|---|
| NONE | 0 |
| LOW | 0.25 |
| MEDIUM | 0.5 |
| HIGH | 0.75 |
| CRITICAL | 1.0 |

| ASSET NAME | POTENTIAL ECONOMIC VALUE |
|---|---|
| END_USER | 4.375B X 0.25 = 1.09375B |
| SOURCE 6 | 4.375B X 0.25 = 1.09375B |

| ASSET NAME | POTENTIAL ECONOMIC VALUE |
|---|---|
| SOURCE 1 | #Operations#Staffing Intangible Worth X 0.25 + #HR#Employees Intangible Worth X 0.50 |

| ASSET NAME | POTENTIAL ECONOMIC VALUE | AEV (IM=0.05) | AEV (DFL=0.2) |
|---|---|---|---|
| END_USER | 4.375B X 0.25 = 1.09375B | 54,687.50 M | 218,750 M |
| SOURCE 6 | 4.375B X 0.25 = 1.09375B | 54,687.50 M | |

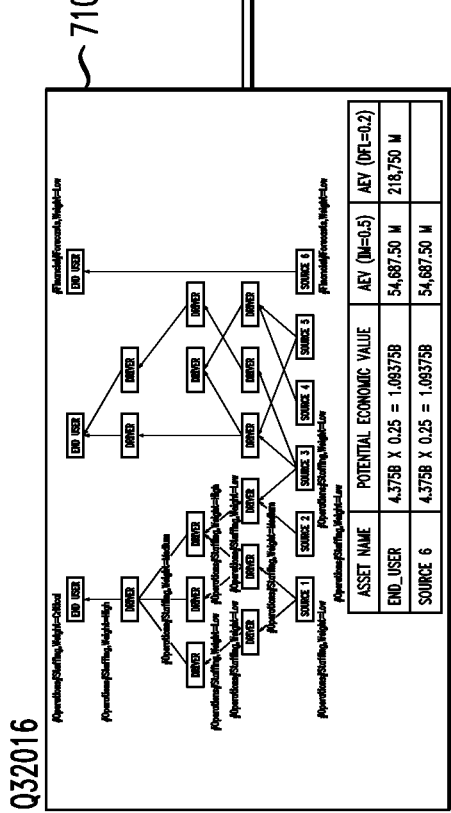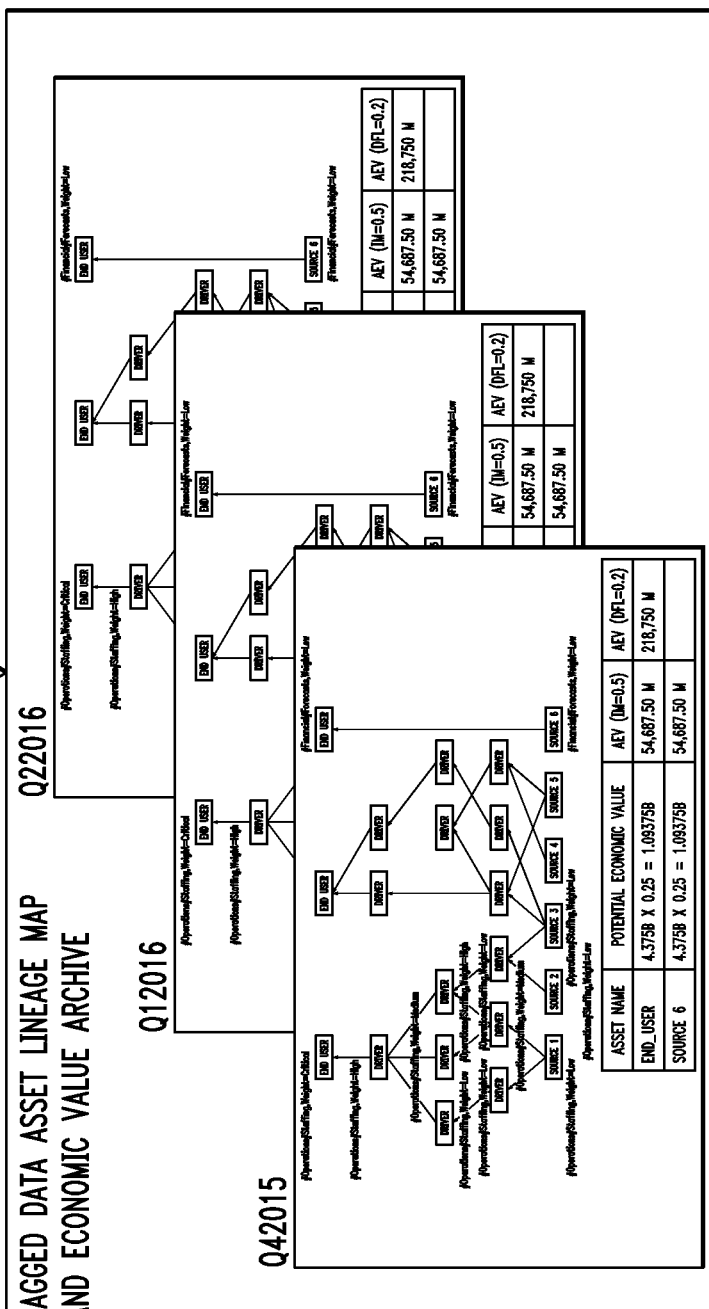
FIG. 7

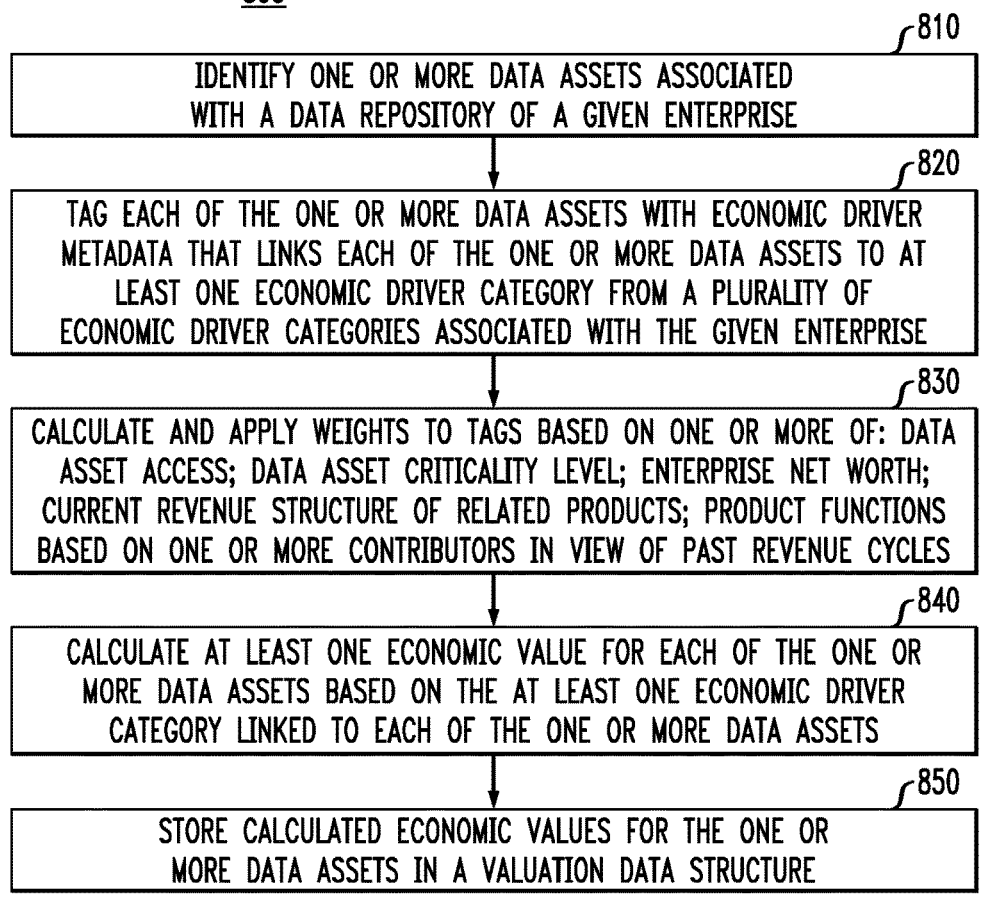
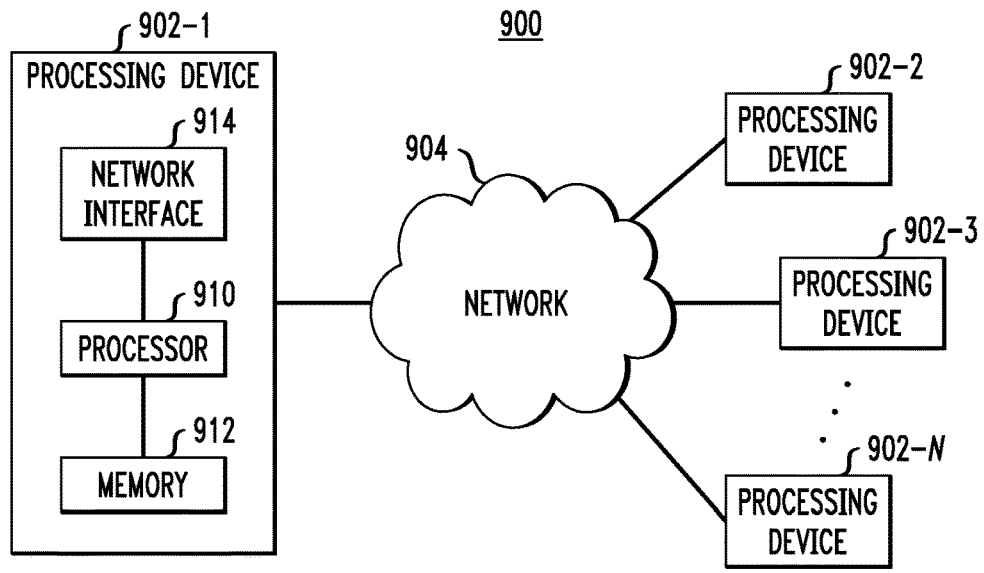

ECONOMIC VALUATION OF DATA ASSETS

FIELD

The field relates generally to data processing and, more particularly, to economic valuation of data assets.

BACKGROUND

As enterprises (e.g., companies, businesses, individuals, etc.) or other entities collect more and more electronic data during the course of their data gathering and processing operations, they are recognizing the importance of calculating the value of such data assets, i.e., performing data valuation.

By way of one example, data valuation can be used to prioritize the business value of different data assets and modify the information technology (IT) infrastructure investment made by the enterprise based on that value (e.g., use disaster recovery for higher value data sets).

However, while possible to assign some type of business value to data assets, it is difficult to assign economic (e.g., dollar) value to data assets.

SUMMARY

Embodiments of the invention provide techniques for economic data valuation of data assets.

For example, in one embodiment, a method comprises the following steps. One or more data assets associated with a data repository of a given enterprise is identified. Each of the one or more data assets is tagged with economic driver metadata that links each of the one or more data assets to at least one economic driver category from a plurality of economic driver categories associated with the given enterprise. At least one economic value is calculated for each of the one or more data assets based on the at least one economic driver category linked to each of the one or more data assets. Calculated economic values for the one or more data assets are stored in a valuation data structure.

Advantageously, in accordance with illustrative embodiments, the above-described method leverages data asset lineage maps and overlays them with a separate metadata subgraph containing corporate economic metrics known as revenue recognition drivers (RRD). As such, economic value can be efficiently and effectively calculated for the data assets enabling the treatment of such data, considered to be an intangible asset, as a capital asset.

These and other features and advantages of the invention will become more readily apparent from the accompanying drawings and the following detailed description.

BRIEF DESCRIPTION OF THE DRAWINGS

FIG. 2 illustrates a revenue recognition driver table, according to an embodiment of the invention.

FIG. 6A illustrates an economic valuation table for data assets, according to an embodiment of the invention.

FIG. 6B illustrates an economic valuation table for a multi-tagged data asset, according to an embodiment of the invention.

FIG. 6C illustrates an economic valuation table for data assets with potential and actual economic values, according to an embodiment of the invention.

FIG. 7 illustrates a methodology for storing and querying economic valuation data structures, according to an embodiment of the invention.

FIG. 8 illustrates a methodology for economic valuation of data assets, according to an embodiment of the invention.

FIG. 9 illustrates a processing platform used to implement a data asset economic valuation engine and its corresponding environment, according to an embodiment of the invention.

DETAILED DESCRIPTION

Figure 1:
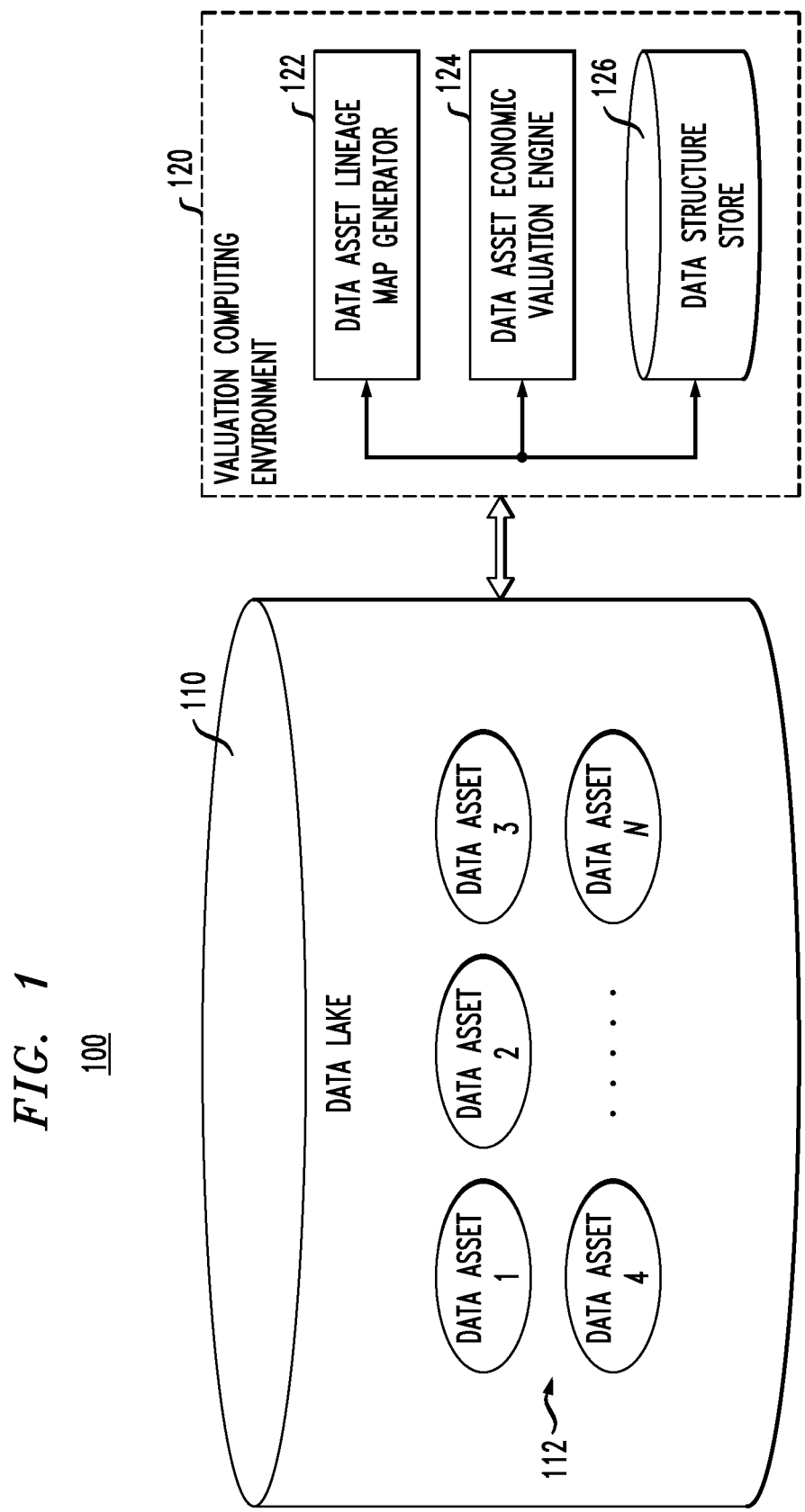
FIG. 1 illustrates a data asset economic valuation engine and its corresponding environment, according to an embodiment of the invention.

Illustrative embodiments may be described herein with reference to exemplary cloud infrastructure, data repositories, data centers, data processing systems, computing systems, data storage systems and associated servers, computers, storage units and devices and other processing devices. It is to be appreciated, however, that embodiments of the invention are not restricted to use with the particular illustrative system and device configurations shown. Moreover, the phrases "cloud infrastructure," "data repository," "data center," "data processing system," "information processing system," "computing environment," "computing system," "data storage system," "data lake," and the like as used herein are intended to be broadly construed, so as to encompass, for example, private and/or public cloud computing or storage systems, as well as other types of systems comprising distributed virtual infrastructure. However, a given embodiment may more generally comprise any arrangement of one or more processing devices.

As used herein, the following terms and phrases have the following illustrative meanings:

"metadata" as used herein is intended to be broadly construed, and may comprise, for example, data that describes or defines data;

"valuation" as used herein is intended to be broadly construed, and may comprise, for example, a computation and/or estimation of something's worth or value for a given context;

"context" as used herein is intended to be broadly construed, and may comprise, for example, time, place, surroundings, circumstances, environment, background, settings, and/or the like, that determine, specify, and/or clarify something;

"node" as used herein is intended to be broadly construed, and may comprise, for example, a data structure element with which an input to an analytic process, a result of execution of an analytic process, or an output from an analytic process is associated, along with metadata if any; examples of nodes include, but are not limited to, structured database nodes, graphical nodes, and the like;

"connector" as used herein is intended to be broadly construed, and may comprise, for example, a data structure element which connects nodes in the data structure, and with which transformations or actions performed as part of the analytic process are associated, along with metadata if any; examples of connectors include, but are not limited to, arcs, pointers, links, etc.;

"analytic sandbox" as used herein is intended to be broadly construed, and may comprise, for example, at least a part of an analytic computing environment (including specifically allocated processing and storage resources) in which one or more analytic processes are executed on one or more data sets; for example, the analytic process can be part of a data science experiment and can be under the control of a data scientist, an analytic system, or some combination thereof;

"data asset" as used herein is intended to be broadly construed, and may comprise, for example, one or more data items, units, elements, blocks, objects, sets, fields, and the like, combinations thereof, and otherwise any information that is obtained and/or generated by an enterprise;

"enterprise" as used herein is intended to be broadly construed, and may comprise, for example, a company, business, or other type of organization, an individual, and combinations thereof;

"user" as used herein is intended to be broadly construed, and may comprise, for example, numerous arrangements of human, hardware, software or firmware entities, as well as combinations of such entities. Accordingly, a user may be a human user, a software entity such as an application, a computing or processing device, or any of a wide variety of other entity arrangements.

As mentioned above, due at least in part to the intangible nature of data assets, enterprises have struggled to assign economic value to information. A variety of research initiatives have emerged to attempt to determine value of a data asset.

By way of example, data valuation models are described in D. Laney, "The Economics of Information Assets," The Center for Infonomics, Smarter Companies presentation, September 2011. Such valuation models include a set of non-financial models and set of financial models. As shown, the non-financial models include: (i) an intrinsic value of information model, which represents a measure of a value of the correctness, completeness, and exclusivity (scarcity) of the data set; (ii) a business value of information model, which represents a measure of a value of the sufficiency and relevance of the data set for specific purposes; and (iii) a performance value of information model, which represents a measure of a value of how the data set affects key business drivers. The financial models include: (i) a cost value of information model, which represents a measure of a value of the cost of losing the data set; (ii) a market value of information model, which represents a measure of a value of the amount that could be obtained by selling or trading the data set; and (iii) an economic value of information model, which represents a measure of economic value for the data set based on performance indicators, acquisition expense, administration expense, and application expense, over an average expected lifespan of the data set thereby attempting to express how the data set contributes to a financial bottom line.

While the above-mentioned economic value of information model can be used as a starting point for understanding the association of economic value to data assets, the implementation of this model is made difficult, inter alia, by legacy IT architectures in which data assets are disassociated from financial performance. Therefore, existing algorithms for calculating data revenue during certain time periods can be manual, error-prone experiences.

More generally, the value of the information (data assets) in an enterprise can be calculated by applying various approaches such as: market valuation, how much a buyer is willing to pay for this information, or barter for an exchange for money, other information etc. However, from the revenue perspective, an enterprise is often more interested in using the information to generate sales leads and potentially convert those leads to actual revenue. One of the assumptions made during this digital era is that enterprises will make use of information to target customers with specific marketing messages, promote products based on their interests, and generate revenue.

The problem most enterprises face is how to find out (in an automated fashion) where this information can be found, how much it has contributed to historical revenue, and how much it will contribute to future revenue. Examples of the problems, as realized herein, include the following drawbacks.

Corporate storage paradigms do not typically map raw (or processed) data to the relevant business units that either generate or consume that data. This disassociation makes it near impossible to understand the usage of data as an asset that contributes to income.

Most metadata attached to a data element has to do with file attributes (e.g., creation/modification time, owner, etc.) or application-contextual information. Neither forms of metadata contain a description of how the data is used to generate revenue. Metadata specific to the writing application often has nothing to do with other applications that read the data and generate revenue.

A data element may be relevant to a specific revenue event, but there are problems with determining how much of a contribution a data element made to the revenue event. For example, was only one field relevant, or were dozens of fields relevant? If two data assets were involved, which one was more relevant to the revenue event? This is a problem for upstream data sets as well, as explained below.

If a particular data asset (e.g., a business insight resulting in an executive decision bringing financial benefit) is determined to have contributed to a certain level of revenue, there is no existing way to determine the level of contribution that antecedent data sets contributed to end user assets. Similarly, there is no existing method for decreasing the value of antecedent data sets as they get further and further away from data assets that are directly associated with revenue.

Some organizations use metadata tagging for data elements that are deemed "critical" to the business. However, this indication of data criticality is currently not factored into derived economic value.

As data assets are dynamically used in business moments that generate revenue, there is no existing mechanism to instantaneously reflect changes in economic value for data assets involved with the business transaction.

Calculating value and associating it to a dollar amount may best be described as potential economic value. There are no existing algorithms to calculate actual economic value using industry standard valuation calculations and/or more well-defined business processes that can more directly pinpoint the contribution of a data asset to revenue.

Calculating the economic value of data involves knowing the lifespan of data and the period of time over which the evaluation involving the asset was conducted. While data lifespan can be calculated using existing aging algorithms that are well known in the industry, tracking a specific time period for business usage of an asset is not currently available.

Embodiments of the invention overcome the above as well as other drawbacks associated with existing approaches to calculating economic value for data assets of an enterprise. As will be further explained herein, illustrative embodiments leverage data structures in the form of data asset lineage maps and overlay them with a separate subgraph of metadata containing economic drivers (metrics) known as revenue recognition drivers (RRD). An RRD, in illustrative embodiments, is essentially a category representing a division of a company with formal profits and liabilities (P&L) line of sight. An example of an RRD table is shown and will be described further below in the context of FIG. 2.

FIG. 1 illustrates a data asset economic valuation engine and its corresponding environment 100, according to an embodiment of the invention. As shown, environment 100 comprises a data lake 110 which itself comprises a plurality of data assets 112 (e.g., data assets 1, 2, 3, 4, ... N). The data lake 110 is operatively coupled to a valuation computing environment 120 which comprises a data asset lineage map generator 122, a data asset economic valuation engine 124, and a data structure store 126, all of which are described in further detail below.

In this illustrative embodiment, it is assumed that at least a subset of the data assets 112 of the enterprise comprise data ingested into at least one data lake of the enterprise. A given such data lake in some embodiments comprises a busness data lake or BDL. Thus, data lake 110 in some embodiments may be a BDL.

The term "data lake" as utilized herein is intended to be broadly construed so as to encompass, for example, a data repository that stores data for particular predetermined types of analysis or other processing. For example, a data lake can be configured to store data in a manner that facilitates flexible and efficient utilization of the stored data to support processing tasks that may be at least partially unknown or otherwise undefined at the time of data storage. This is in contrast to so-called data warehouses or data marts, which generally store data in accordance with particular predefined sets of data attributes or with predetermined data interrelationships.

Moreover, a data lake in some embodiments can provide the ability to deal with flexible combinations of a wide variety of different types of data in different analytics contexts. Examples of analytics contexts that may be supported by one or more analytics platforms in illustrative embodiments include financial services, telecommunications, health care, life sciences, manufacturing, energy, transportation, entertainment, data center security, sensor data processing and numerous others.

Data lakes in some embodiments provide the ability for the users to store different types of data in various data containers of their choosing. The data containers may be provided in multiple types, formats and storage capabilities. A given data scientist or other user may prefer to utilize one type of data container over another based on familiarity, standards, type of analytics, type of models and processing capabilities.

The components of the valuation computing environment 120 are coupled to the components of the data lake 110. While components of the valuation computing environment 120 are shown separate from components of the data lake 110, it is to be appreciated that some or all of the components can be implemented together (e.g., within the data lake).

In one illustrative embodiment, the valuation computing environment 120 is configured to execute an analytic process (e.g., a data science experiment) on one or more of the plurality of data assets 112. The data asset lineage map generator 122 is configured to generate, during the course of execution of the analytic process, a data asset lineage map (i.e., data structure) comprising nodes that represent data assets (data assets 112 in data lake 110) and connectors that represent relationships between the data assets. It is to be understood that at least a portion of the data assets in the data asset lineage map represent results and/or attributes associated with execution of the analytic process. An example of a data asset lineage map is shown and will be described further below in the context of FIG. 3. The data asset lineage maps that are generated by the data asset lineage map generator 122 are stored in the data structure store 126.

One non-limiting example of a methodology for generating a data asset lineage map is described in U.S. Ser. No. 15/135,817, filed on Apr. 22, 2016 and entitled "Data Value Structures," the disclosure of which is incorporated by reference herein in its entirety.

Furthermore, in one embodiment, the valuation computing environment 120 comprises a data analytic sandbox (not expressly shown). The data analytic sandbox can be used to condition and experiment with the data assets 112 and preferably has: (i) large bandwidth and sufficient network connections; (ii) a sufficient amount of data capacity for data sets including, but not limited to, summary data, structured/unstructured, raw data feeds, call logs, web logs, etc.; and (iii) transformations needed to assess data quality and derive statistically useful measures. Regarding transformations, it is preferred that data is transformed after it is obtained, i.e., ELT (Extract, Load, Transform), as opposed to ETL (Extract, Transform, Load). However, the transformation paradigm can be ETLT (Extract, Transform, Load, Transform again), in order to attempt to encapsulate both approaches of ELT and ETL. In either the ELT or ETLT case, this allows analysts to choose to transform the data (to obtain conditioned data) or use the data in its raw form (the original data). Examples of transformation tools that can be available as part of the data analytic sandbox include, but are not limited to, Hadoop™ (Apache Software Foundation) for analysis, Alpine Miner™ (Alpine Data Labs) for creating analytic workflows, and R transformations for many general purpose data transformations. Of course, a variety of other tools may be part of the data analytic sandbox.

As further shown in the valuation computing environment 120 of FIG. 1, the data asset economic valuation engine 124 is operatively coupled to the data asset lineage map generator 122. While illustratively shown as separate components in FIG. 1, it is to be understood that the functions of components 122 and 124 may be combined within a single component. The data asset economic valuation engine 124 identifies one or more data assets (from data assets 112 in data lake 110) which, in one embodiment, are represented in the form of a data asset lineage map generated by the data asset lineage map generator 122. Each of the one or more data assets in the lineage map is tagged with economic driver metadata in the form of one or more RRD categories. The metadata thereby links each of the one or more data assets to at least one RRD category from a plurality of RRD categories associated with the given enterprise (e.g., as will be illustrated and explained below in the context of FIG. 2). The data asset economic valuation engine 124 calculates at least one economic value for each of the one or more data assets based on the at least one RRD category linked to each of the one or more data assets. These calculated economic values for the one or more data assets are stored in one or more economic valuation tables. The economic valuation tables that are generated by the data asset economic valuation engine 124 are stored in the data structure store 126. These steps will be further explained below.

As mentioned above, data is an intangible asset, and the data asset economic valuation engine 124 maps data assets to intangible worth when it can be determined that the data asset contributes to intangible worth. FIG. 2 illustrates a revenue recognition driver (RRD) table 200 of intangible assets, according to an embodiment of the invention. In the example shown in table 200, it is assumed that a company with $110B in revenue maintains seven different RRD categories, each mapping to a specific contribution towards an intangible (data) worth total of $50B. In certain implementations, the RRD can be further broken down into sub-RRD categories.

For example, as shown in table 200, the financial RRD generates an intangible worth of $12.5B, but it can be further broken down into the following sub-categories along with their individual contributions to the intangible worth of the overall category:

Financial#Revenue(15%): $1.875B;
Financial#Bookings(35%): $4.375B;
Financial#Forecasts(35%): $4.375B
Financial#Tax(15%): $1.875B In illustrative embodiments, the RRD table 200 is a foundational element for either the manual and/or automatic tagging of data assets to RRDs and/or their sub-categories. The table 200 may be generated by an enterprise and stored in data structure store 126 for use by the data asset economic valuation engine 124 in tagging data assets in a data asset lineage map.

Figures 3, 4:
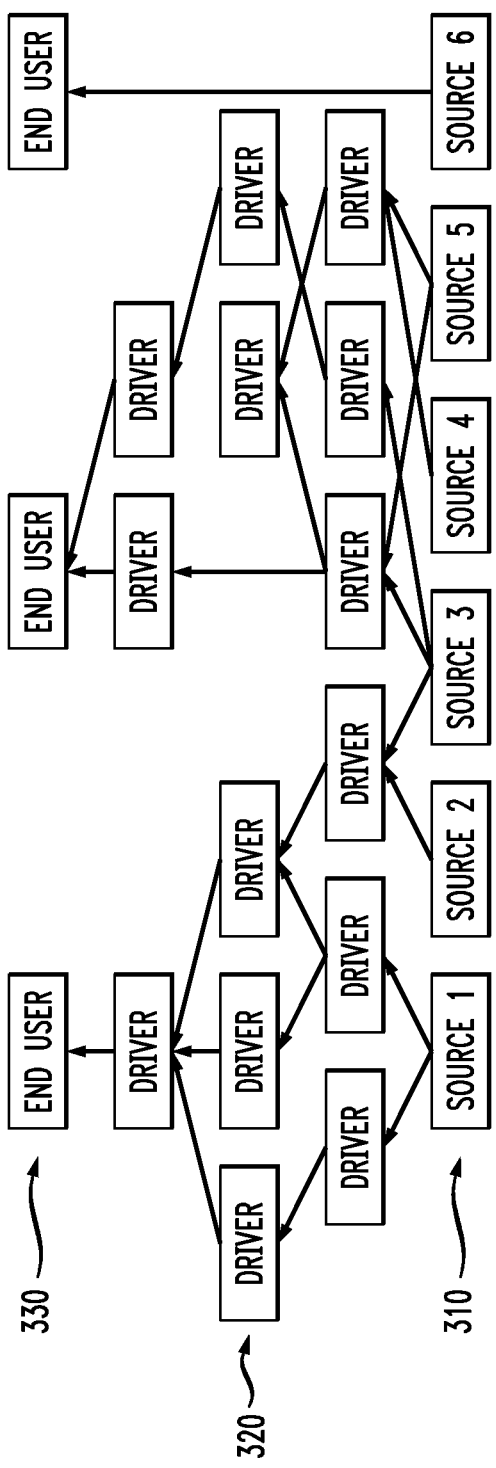
FIG. 3 illustrates a data asset lineage map, according to an embodiment of the invention.
FIG. 4 illustrates a weight assignment table for a criticality level associated with a data asset, according to an embodiment of the invention.

FIG. 3 illustrates a data asset lineage map, according to an embodiment of the invention. The map 300 shown in FIG. 3 is generated by the data asset lineage map generator 122. By way of example only, the techniques described in the above-referenced U.S. Ser. No. 15/135,817 may be used by the data asset lineage map generator 122 to generate map 300.

As shown, data asset lineage map 300 comprises multiple nodes connected by multiple connectors. The nodes and connectors can each store metadata. The nodes represent data assets 112 and the connectors represent relationships between the data assets 112. Nodes, in this example, comprise a set of source nodes 310, a set of intermediate (driver) nodes 320, and a set of top-level (or end-user) nodes 330.

More particularly, data asset lineage map 300 illustrates a hierarchical data structure that comprises six data assets located in the bottom row and collectively labeled "source" asset nodes 310 (source1, source2, source3, source4, source5, and source6). One or more data scientists can explore this source data, perform analytics, and generate intermediate data sets collectively labeled as driver nodes 320. Then results and recommendations can be generated for the business collectively labeled as end user nodes 330. By tracking the lineage from the sources up to the end user nodes, an enterprise can obtain significant insight into how its data assets are related by generating and utilizing such data asset lineage maps.

Manual and automatic tagging of data assets represented in data asset lineage map 300 will now be explained.

Assume, by way of example, that a data scientist conducts an experiment in which the data scientist performs analytics on a given file (e.g., source6 in lineage map 300) and directly generates an end_user result (upper right corner of lineage map 300) that is subsequently presented to a client. This client could be internal (a business unit) or external (a paying customer). If the data scientist is aware of the business unit or customer support/sales organization that is leveraging the content, they can attach an appropriate RRD tag (from table 200 in FIG. 2) to the end_user asset. For example, if the end_user report is leveraged in a marketing forecast, the end_user data asset can be labeled as "#Financial" or "#Financial#Forecasts". The tag can then be fed into different valuation algorithms executed by the data asset economic valuation engine 124 as will be described below.

Additionally or alternatively, RRD and sub-RRD tagging can be automated by mapping the identity of the overseeing data scientist to the organization (RRD tag) to which they belong. For example, a data scientist may be employed within the Staffing department of the Operations business unit. Therefore, any assets that they generate (either driver assets or end user assets) can be tagged as #Operations#Staffing when they are committed back into a data lake or other repository. Similarly, any assets that the data scientist consumes can be tagged with their RRD based on their identity. For example, a data scientist combining multiple driver assets to create an end_user asset can result in those driver assets being tagged as well.

Furthermore, it is realized herein that data lakes typically grant access to data assets based on authentication and authorization protocols. These protocols identify the consuming individual, which can also be mapped to RRD categories/sub-categories. For example, if an individual from the HR Employees department accesses an end_user report generated by a data scientist from Operations, this access can result in the tagging of the end user asset as #HR#Employees.

When an automated mechanism performs RRD tagging against a data asset, the system runs the risk of tagging RRD consumers who do not end up ultimately leveraging the asset in a way that is impactful (e.g., they were just browsing the data asset). For this scenario, the automated tagging mechanism can weight the tag by tracking the number of times this individual (or the organization) accessed the asset. Note that this access weighting mechanism can be applied whether the tagging approach is manual or automated.

For example, if an employee from #HR#Employees accesses the given data asset, a counter for that access can be incremented. As this counter passes thresholds, the weight assigned to the tag can move from a reduced weight (e.g., "Low") to a more significant weight (e.g., "High"). This weighting can be used in the subsequent valuation algorithms executed by the data asset economic valuation engine 124 described below.

As data assets are tagged with RRD metadata, it is possible for the RRD tag to migrate to upstream assets that contributed to that asset. For the case where an end_user asset was generated by source6, an RRD tag placed on the end_user asset can migrate upstream and also be attached to source6. This is illustrated in map 300 in FIG. 3. This allows contributing and original source data assets to be considered as having some form of economic value.

Furthermore, the above-described weights can be applied upstream as well. However, an automated algorithm can also determine the "contribution level" of a given asset. For example, in map 300, source2 and source3 are both depicted as contributing to a driver asset. If only one field was leveraged from source2, and 10 fields were leveraged from source3, an automated weighting algorithm can assign increased importance or weight to source3 as compared with source2. As upstream tagging continually ascends to older and older ancestors, the weighting algorithm can choose to further decrease the weight if desired.

A further embodiment of weighting can leverage knowledge of whether or not the data asset has been assigned a status of "critical." By way of example only, criticality can be determined and assigned in accordance with techniques described in U.S. Ser. No. 15/359,916, filed on Nov. 23, 2016 and entitled "Automated Identification and Classification of Critical Data Elements," the disclosure of which is incorporated by reference herein in its entirety. A status of critical can signal valuation algorithms to apply an increased (or full) weight to a data asset. Given this weighting approach, a valuation algorithm determines weights for a given data asset and assigns criticality multipliers shown in table 400 of FIG. 4. Such valuation algorithms are executed by the data asset economic valuation engine 124.

Using the approaches of RRD tagging and weighting described above, FIG. 5 illustrates the data asset lineage map 300 of FIG. 3 tagged with revenue recognition driver metadata based on categories/sub-categories in table 200 of FIG. 2 and assigned weight based on criticality levels in table 400 of FIG. 4. The resulting data asset lineage map is denoted as data asset lineage map 500 in FIG. 5.

Figure 5:
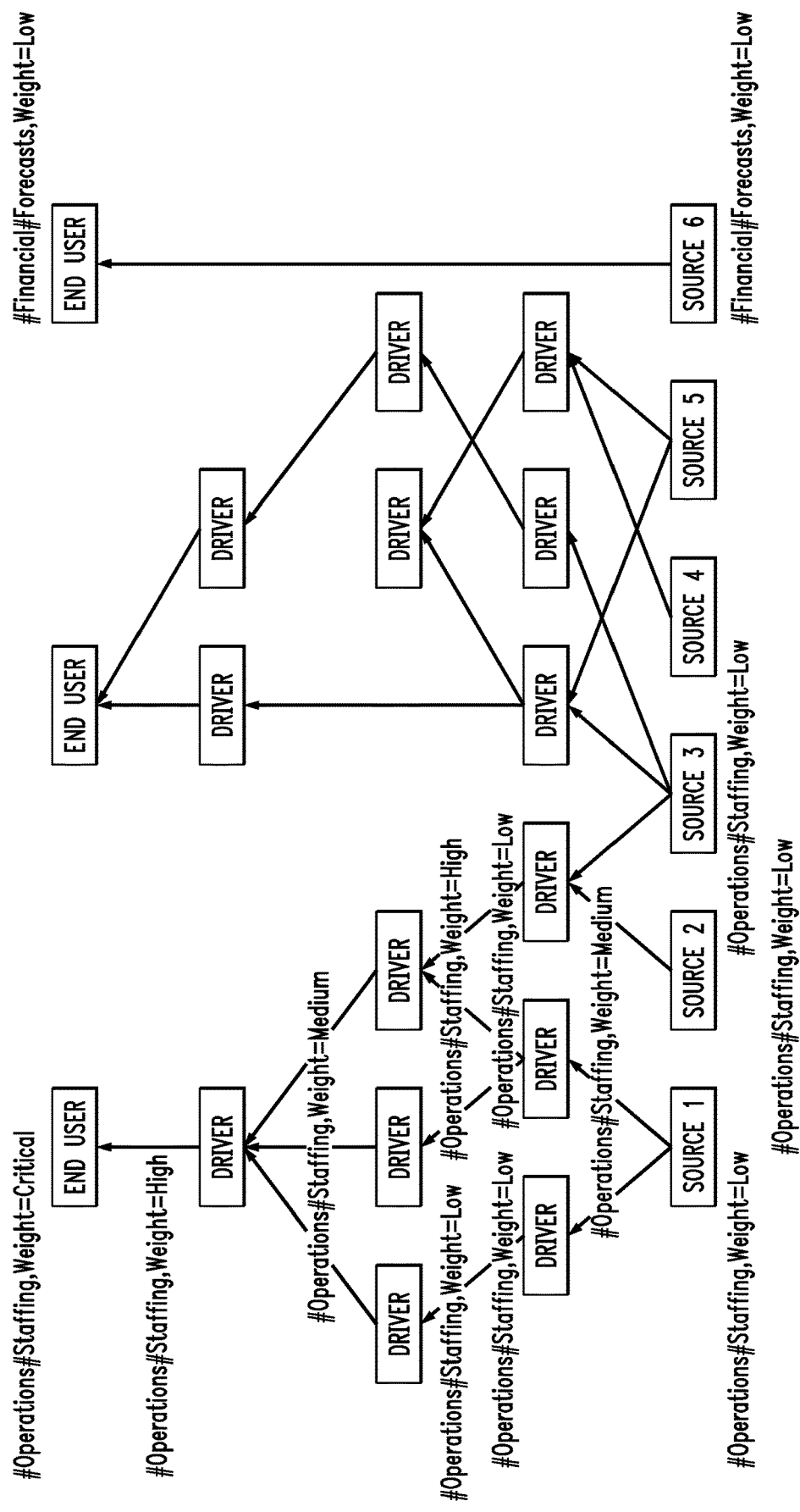
FIG. 5 illustrates a data asset lineage map tagged with revenue recognition driver metadata and assigned weight based on criticality levels, according to an embodiment of the invention.

A valuation algorithm executed by the data asset economic valuation engine 124 can run at a certain period (e.g., daily, weekly, monthly, etc.) to generate an economic value for all given data assets. For example, as shown in table 610 of FIG. 6A, source6 and its resulting end_user asset is each assigned a potential economic value (PEV) as shown. More particularly, note that source6 in FIG. 5 is tagged with the following metadata: #Financial#Forecasts, Weight=Low, indicating the source6 data asset is attributed to the RRD category/sub-category Financial/Forecasts and assigned a low criticality weight. As such, economic valuation for source6 (and end_user) is calculated as 35% (Forecast sub-category contribution in FIG. 2) of $12.5B (overall worth of Financial RRD in FIG. 2) or $4.375B, multiplied by 0.25 (multiplier associated with low criticality in FIG. 4). The resulting economic value is $1.09375B as shown in FIG. 6A.

This result does not necessarily imply that each asset is worth 1.09 billion dollars, but the data asset economic valuation engine 124 has now successfully linked a data asset to an organization that was responsible for a known amount of intangible worth.

For data assets that may have multiple RRD tags, the result can be additive. For example, if data asset "source1" (tagged in map 500 of FIG. 5 as #Operations#Staffing, Weight=Low") was also tagged as #HR#Employees, Weight=Medium, table 620 in FIG. 6B describes the result of the economic value calculation. Such valuations of nodes of a hierarchical tree structure as shown in FIG. 5 may be referred to as tree walking.

Tree-walking valuation can further modify potential economic value by taking into account the length of each "branch" in a valuation tree or graph. For example, the "end_user/source6" table 610 shown in FIG. 6A has a branch length of 2 (includes two nodes). The valuation algorithm executed by the data asset economic valuation engine 124 has assigned a PEV of $1.09375B to each node. The valuation algorithm could also calculate a PEV as follows:
1. Divide the PEV by branch length and assign each node a value of 546,875M.
2. Determine that only ten percent of source6 was used to generate the end_user data asset:
   a. Source6=193750M
   b. End_user=900000M
3. Factor in other branches that contributed to the same end_user data asset and further reduce the PEV contribution.

Valuation algorithms can also be run by the data asset economic valuation engine 124 to further reduce the PEV to be an actual economic value (AEV). In other words, algorithms can be employed that more accurately take into account the use of the data asset to give a more reasonable estimation of the assets contribution to the financial bottom line of the enterprise.

One approach is to use an industry multiplier (IM). By way of non-limiting example, some data valuation analysts have suggested an IM at 5-10%.

Another approach is to leverage any existing data feedback loops (DFLs as defined by Wikibon) that tangibly capture which corporate assets (e.g., data, people, equipment) were used in a "business moment" (as defined by Wikibon) to result in business income. Examples include:
  Algorithms producing data that resulted in lead-generation where a salesperson drove their corporate car to visit the lead and recognized income.
  Algorithms that use data to programmatically control actuators (e.g. Internet of Things) that resulted in tangible business income.

Table 630 in FIG. 6C shows how the PEV can be converted into AEV when using an IM value of 0.05 and a DFL of 0.2.

Note that in the case of DFL valuation, the end_user asset was directly used in the business moment and the algorithm may or may not choose to "cascade" that value upstream.

Note also that the illustrative economic valuation tables shown in FIGS. 6A, 6B, and 6C are stored by the data asset economic valuation engine 124 in data structure store 126.

In addition to the static tree-walking approach mentioned above, valuation algorithms can be run by the data asset economic valuation engine 124 every time RRD metadata is attached to a node. This dynamic tree-walking allows for instantaneous and real-time calculation of economic data values, which can trigger real-time actions should certain data assets rise or fall to different levels.

At any given point in time (daily, weekly, monthly, quarterly) the entire valuation tree (e.g., weight-tagged data asset lineage map 500), the PEV/AEV amounts (tables 610, 620, and 630), or both, can be archived and time-stamped. FIG. 7 illustrates a methodology for archiving and querying such economic valuation data structures. As shown, a valuation tree with PEV/AEV amounts (denoted as 710) for financial epoch Q32016 is archived in a valuation tree catalog 720 which contains valuation trees and PEV/AEV amounts for previous epochs (Q42015, Q12016, Q22016). The tree catalog 720 may be queried 730 by individuals or other systems to access and review archived valuation trees and PEV/AEV amounts. By archiving the revenue impact of data assets using the approach above, the period of time the experiment or trial was conducted can be calculated with certainty.

It is to be further appreciated that the PEV/AEV amounts calculated in accordance with illustrative embodiments described herein can also be utilized for the one or more data assets in other economic metrics. By way of example only, the PEV/AEV amounts for a given data asset can be plugged into the overall Laney economic value of information model mentioned above and the data asset's contribution (positive or negative) can be calculated.

FIG. 8 illustrates a methodology 800 that summarizes steps for economic valuation of data assets, according to an embodiment of the invention.

As shown, step 810 identifies one or more data assets (e.g., data assets 112) associated with a data repository (e.g., data lake 110) of a given enterprise.

Step 820 tags each of the one or more data assets with economic driver metadata that links each of the one or more data assets to at least one economic driver category from a plurality of economic driver categories (e.g., RRD categories/sub-categories from table 200) associated with the given enterprise. It is to be appreciated that these economic driver categories and their sub-categories can also be defined by the methodology 800. In one example, the RRD categories/sub-categories are defined from previous revenue cycles for the given enterprise.

Step 830 calculates and applies weights to the tags. The weights can be based on one or more of: data asset access; data asset criticality level (e.g., table 400); enterprise net worth (known or calculated); current revenue structure of products related to the one or more data assets; product functions based on one or more contributors in view of past revenue cycles (e.g., as per FIG. 2). Thus, by way of example only, based on revenues from past revenue cycles for products of the enterprise that relate to the data assets, different weights can be determined and applied to the tags. It is to be appreciated that weights can be determined or classified using alternative techniques and/or criteria.

Step 840 calculates at least one economic value (e.g., PEV/AEV) for each of the one or more data assets based on the at least one economic driver category linked to each of the one or more data assets.

Step 850 stores calculated economic values for the one or more data assets in a valuation data structure.

As an example of a processing platform on which a data asset economic valuation engine and its corresponding environment (e.g., 100 in FIG. 1) according to illustrative embodiments can be implemented is processing platform 900 shown in FIG. 9. The processing platform 900 in this embodiment comprises a plurality of processing devices, denoted 902-1, 902-2, 902-3, ... 902-N, which communicate with one another over a network 904. It is to be appreciated that the data asset economic valuation methodologies described herein may be executed in one such processing device 902, or executed in a distributed manner across two or more such processing devices 902. The cloud infrastructure environment may also be executed in a distributed manner across two or more such processing devices 902. The various functionalities described herein may be executed on the same processing devices, separate processing devices, or some combination of separate and the same (overlapping) processing devices. It is to be further appreciated that a server, a client device, a computing device or any other processing platform element may be viewed as an example of what is more generally referred to herein as a "processing device." As illustrated in FIG. 9, such a device generally comprises at least one processor and an associated memory, and implements one or more functional modules for instantiating and/or controlling features of systems and methodologies described herein. Multiple elements or modules may be implemented by a single processing device in a given embodiment.

The processing device 902-1 in the processing platform 900 comprises a processor 910 coupled to a memory 912. The processor 910 may comprise a microprocessor, a microcontroller, an application-specific integrated circuit (ASIC), a field programmable gate array (FPGA) or other type of processing circuitry, as well as portions or combinations of such circuitry elements. Components of systems as disclosed herein can be implemented at least in part in the form of one or more software programs stored in memory and executed by a processor of a processing device such as processor 910. Memory 912 (or other storage device) having such program code embodied therein is an example of what is more generally referred to herein as a processor-readable storage medium. Articles of manufacture comprising such processor-readable storage media are considered embodiments of the invention. A given such article of manufacture may comprise, for example, a storage device such as a storage disk, a storage array or an integrated circuit containing memory. The term "article of manufacture" as used herein should be understood to exclude transitory, propagating signals.

Furthermore, memory 912 may comprise electronic memory such as random access memory (RAM), read-only memory (ROM) or other types of memory, in any combination. The one or more software programs when executed by a processing device such as the processing device 902-1 causes the device to perform functions associated with one or more of the components/steps of system/methodologies in FIGS. 1-8. One skilled in the art would be readily able to implement such software given the teachings provided herein. Other examples of processor-readable storage media embodying embodiments of the invention may include, for example, optical or magnetic disks.

Processing device 902-1 also includes network interface circuitry 914, which is used to interface the device with the network 904 and other system components. Such circuitry may comprise conventional transceivers of a type well known in the art.

The other processing devices 902 (902-2, 902-3, ... 902-N) of the processing platform 900 are assumed to be configured in a manner similar to that shown for computing device 902-1 in the figure.

The processing platform 900 shown in FIG. 9 may comprise additional known components such as batch processing systems, parallel processing systems, physical machines, virtual machines, virtual switches, storage volumes, etc. Again, the particular processing platform shown in this figure is presented by way of example only, and the data valuation system and cloud infrastructure described herein may include additional or alternative processing platforms, as well as numerous distinct processing platforms in any combination.

Also, numerous other arrangements of servers, clients, computers, storage devices or other components are possible in processing platform 900. Such components can communicate with other elements of the processing platform 900 over any type of network, such as a wide area network (WAN), a local area network (LAN), a satellite network, a telephone or cable network, or various portions or combinations of these and other types of networks.

Furthermore, it is to be appreciated that the processing platform 900 of FIG. 9 can comprise virtual machines (VMs) implemented using a hypervisor. A hypervisor is an example of what is more generally referred to herein as "virtualization infrastructure." The hypervisor runs on physical infrastructure. As such, the techniques illustratively described herein can be provided in accordance with one or more cloud services. The cloud services thus run on respective ones of the virtual machines under the control of the hypervisor. Processing platform 900 may also include multiple hypervisors, each running on its own physical infrastructure. Portions of that physical infrastructure might be virtualized.

As is known, virtual machines are logical processing elements that may be instantiated on one or more physical processing elements (e.g., servers, computers, processing devices). That is, a "virtual machine" generally refers to a software implementation of a machine (i.e., a computer) that executes programs like a physical machine. Thus, different virtual machines can run different operating systems and multiple applications on the same physical computer. Virtualization is implemented by the hypervisor which is directly inserted on top of the computer hardware in order to allocate hardware resources of the physical computer dynamically and transparently. The hypervisor affords the ability for multiple operating systems to run concurrently on a single physical computer and share hardware resources with each other.

An example of a commercially available hypervisor platform that may be used to implement portions of the processing platform 900 in one or more embodiments of the invention is the VMware vSphere (VMware Inc. of Palo Alto, Calif.) which may have an associated virtual infrastructure management system such as the VMware vCenter. The underlying physical infrastructure may comprise one or more distributed processing platforms that include storage products such as VNX and Symmetrix VMAX (both available from EMC Corporation of Hopkinton, Mass.). A variety of other computing and storage products may be utilized to implement the one or more cloud services that provide the functionality and features described herein.

It was noted above that portions of the data valuation system and cloud environment may be implemented using one or more processing platforms. A given such processing platform comprises at least one processing device comprising a processor coupled to a memory, and the processing device may be implemented at least in part utilizing one or more virtual machines, containers or other virtualization infrastructure. By way of example, such containers may be Docker containers or other types of containers.

It should again be emphasized that the above-described embodiments of the invention are presented for purposes of illustration only. Many variations may be made in the particular arrangements shown. For example, although described in the context of particular system and device configurations, the techniques are applicable to a wide variety of other types of data processing systems, processing devices and distributed virtual infrastructure arrangements. In addition, any simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A method, comprising:
   identifying a plurality of data assets associated with a data repository of a given enterprise;
   tagging each of the plurality of data assets with economic driver metadata that links each of the plurality of data assets to at least one economic driver category from a plurality of economic driver categories associated with the given enterprise, wherein the tagging further comprises creating a data asset lineage map having at least a portion of the economic driver metadata overlaid thereon, wherein the economic driver metadata further comprises one or more economic metrics associated with the given enterprise;
   calculating at least one economic value for each of the plurality of data assets based at least in part on the at least one economic driver category linked to each of the plurality of data assets; and
   storing calculated economic values for the plurality of data assets in a valuation data structure;
   wherein the plurality of data assets are represented in a hierarchical data structure comprising nodes and connectors between the nodes, wherein each of the plurality of data assets is represented by a node in the data structure and a connector between two nodes represents a relationship between the two data assets represented by the connected nodes;
   wherein a first node and a second node contribute to at least a third node in the hierarchical data structure;
   wherein at least a first data asset of the plurality of data assets corresponds to the first node, at least a second data asset of the plurality of data assets corresponds to the second node, and at least a third data asset of the plurality of data assets corresponds to the third node;
   wherein at least one of the first data asset and the second data asset contributes to at least a fourth data asset of the plurality of data assets in addition to contributing to the third data asset;
   wherein the first node and the second node are lower level nodes of the hierarchical data structure and the third node is an upper level node relative to the first node and the second node;
   wherein the economic driver metadata of the first data asset and the second data asset is available to the third data asset and is utilized in determining the at least one economic value for the third data asset;
   wherein the step of calculating at least one economic value for the third data asset comprises weighting contribution levels of the first data asset and the second data asset, the contribution levels of the first data asset and the second data asset being based at least in part on a first number of fields of the first data asset and a second number of fields of the second data asset that are leveraged in generating the third data asset;
   wherein the step of calculating at least one economic value for the third data asset further comprises weighting the contribution levels of the first data asset and the second data asset based at least in part on a first length of a first path in the hierarchical data structure from the first node to the third node and a second length of a second path in the hierarchical data structure from the second node to the third node; and
   wherein the identifying, tagging, calculating, and storing steps are implemented via at least one processing device comprising a processor and a memory.

2. The method of claim 1, wherein the step of calculating at least one economic value further comprises calculating a potential economic value for at least one of the plurality of data assets based at least in part on the at least one economic driver category linked to said at least one of the plurality of data assets.

3. The method of claim 1, wherein the tagging step is performed manually by a user entering the economic driver metadata pertaining to at least one of the plurality of data assets.

4. The method of claim 1, wherein the tagging step is performed automatically by automatically identifying one or more users of at least one of the plurality of data assets, determining an economic driver category based on identities of the one or more users, and associating the corresponding economic driver metadata with said at least one of the plurality of data assets.

5. The method of claim 1, further comprising weighting the economic driver metadata prior to calculating at least one economic value for each of the plurality of data assets.

6. The method of claim 1, further comprising the step of defining the plurality of economic driver categories associated with the given enterprise.

7. The method of claim 1, wherein economic driver metadata tagged to each of the plurality of data assets is stored in the corresponding node of the particular data asset.

8. The method of claim 1, further comprising archiving the hierarchical data structure with a given timestamp such that one or more timestamped versions of the hierarchical data structure are maintained for a subsequent query.

9. The method of claim 1, further comprising one or more of:
 recalculating at least one economic value for each of the plurality of data assets periodically;
 recalculating at least one economic value for each of the plurality of data assets in response to one or more changes to one or more of the plurality of data assets; and
 utilizing the at least one economic value calculated for each of the plurality of data assets in an economic metric.

10. The method of claim 1, wherein the hierarchical data structure comprises:
 a set of source nodes;
 a set of driver nodes each generated by at least one of: one or more of the source nodes and one or more other ones of the driver nodes; and
 a set of end-user nodes each generated by at least one of: one or more of the source nodes; and one or more of the driver nodes;
 wherein the end-user nodes are upstream of the source nodes and the driver nodes in the hierarchical data structure; and
 wherein each of the first node and the second node is at least one of one of the source nodes and one of the driver nodes, and wherein the third node is one of the end-user nodes.

11. The method of claim 2, wherein the step of calculating at least one economic value further comprises calculating an actual economic value for said at least one of the plurality of data assets based at least in part on the potential economic value.

12. The method of claim 4, wherein the user identifying step is performed by identifying the one or more users through a data asset operation comprising one or more of generating said at least one the plurality of data assets, consuming said at least one the plurality of data assets, and authenticating to access said at least one the plurality of data assets.

13. The method of claim 5, wherein the weighting step further comprises assigning a weight to the economic driver metadata.

14. The method of claim 13, wherein the assigned weight for a given one of the plurality of data assets is used to calculate the at least one economic value for the given data asset.

15. The method of claim 13, wherein the assigned weight for a given one of the plurality of assets is based at least in part on one or more of: a number of times the given data asset is accessed; a criticality status associated with the given data asset; a net worth of the given enterprise; a current revenue structure of one or more products related to the given data asset; and one or more product functions based on one or more contributors in view of past revenue cycles.

16. An article of manufacture comprising a processor-readable storage medium having encoded therein executable code of one or more software programs, wherein the one or more software programs when executed by one or more processing devices implement the steps of:
 identifying a plurality of data assets associated with a data repository of a given enterprise;
 tagging each of the plurality of data assets with economic driver metadata that links each of the plurality of data assets to at least one economic driver category from a plurality of economic driver categories associated with the given enterprise, wherein the tagging further comprises creating a data asset lineage map having at least a portion of the economic driver metadata overlaid thereon, wherein the economic driver metadata further comprises one or more economic metrics associated with the given enterprise;
 calculating at least one economic value for each of the plurality of data assets based at least in part on the at least one economic driver category linked to each of the plurality of data assets; and
 storing calculated economic values for the plurality of data assets in a valuation data structure;
 wherein the plurality of data assets are represented in a hierarchical data structure comprising nodes and connectors between the nodes, wherein each of the plurality of data assets is represented by a node in the data structure and a connector between two nodes represents a relationship between the two data assets represented by the connected nodes;
 wherein a first node and a second node contribute to at least a third node in the hierarchical data structure;
 wherein at least a first data asset of the plurality of data assets corresponds to the first node, at least a second data asset of the plurality of data assets corresponds to the second node, and at least a third data asset of the plurality of data assets corresponds to the third node;
 wherein at least one of the first data asset and the second data asset contributes to at least a fourth data asset of the plurality of data assets in addition to contributing to the third data asset;
 wherein the first node and the second node are lower level nodes of the hierarchical data structure and the third node is an upper level node relative to the first node and the second node;
 wherein the economic driver metadata of the first data asset and the second data asset is available to the third data asset and is utilized in determining the at least one economic value for the third data asset;
 wherein the step of calculating at least one economic value for the third data asset comprises weighting contribution levels of the first data asset and the second data asset, the contribution levels of the first data asset and the second data asset being based at least in part on a first number of fields of the first data asset and a second number of fields of the second data asset that are leveraged in generating the third data asset;
 wherein the step of calculating at least one economic value for the third data asset further comprises weighting the contribution levels of the first data asset and the second data asset based at least in part on a first length of a first path in the hierarchical data structure from the first node to the third node and a second length of a second path in the hierarchical data structure from the second node to the third node.

17. The article of manufacture of claim 16, wherein the step of calculating at least one economic value further comprises calculating a potential economic value for at least one of the plurality of data assets based at least in part on the at least one economic driver category linked to said at least one of the plurality of data assets.

18. The article of manufacture of claim 17, wherein the step of calculating at least one economic value further comprises calculating an actual economic value for said at least one of the plurality of data assets based at least in part on the potential economic value.

19. A system comprising:
one or more processors operatively coupled to one or more memories configured to:
identify a plurality of data assets associated with a data repository of a given enterprise;
tag each of the plurality of data assets with economic driver metadata that links each of the plurality of data assets to at least one economic driver category from a plurality of economic driver categories associated with the given enterprise, wherein the tagging further comprises creating a data asset lineage map having at least a portion of the economic driver metadata overlaid thereon, wherein the economic driver metadata further comprises one or more economic metrics associated with the given enterprise;
calculate at least one economic value for each of the plurality of data assets based at least in part on the at least one economic driver category linked to each of the plurality of data assets; and
store calculated economic values for the plurality of data assets in a valuation data structure;
wherein the plurality of data assets are represented in a hierarchical data structure comprising nodes and connectors between the nodes, wherein each of the plurality of data assets is represented by a node in the data structure and a connector between two nodes represents a relationship between the two data assets represented by the connected nodes;
wherein a first node and a second node contribute to at least a third node in the hierarchical data structure;
wherein at least a first data asset of the plurality of data assets corresponds to the first node, at least a second data asset of the plurality of data assets corresponds to the second node, and at least a third data asset of the plurality of data assets corresponds to the third node;
wherein at least one of the first data asset and the second data asset contributes to at least a fourth data asset of the plurality of data assets in addition to contributing to the third data asset;
wherein the first node and the second node are lower level nodes of the hierarchical data structure and the third node is an upper level node relative to the first node and the second node;
wherein the economic driver metadata of the first data asset and the second data asset is available to the third data asset and is utilized in determining the at least one economic value for the third data asset;
wherein the step of calculating at least one economic value for the third data asset comprises weighting contribution levels of the first data asset and the second data asset, the contribution levels of the first data asset and the second data asset being based at least in part on a first number of fields of the first data asset and a second number of fields of the second data asset that are leveraged in generating the third data asset; and
wherein the step of calculating at least one economic value for the third data asset further comprises weighting the contribution levels of the first data asset and the second data asset based at least in part on a first length of a first path in the hierarchical data structure from the first node to the third node and a second length of a second path in the hierarchical data structure from the second node to the third node.

20. The system of claim 19, wherein calculating at least one economic value further comprises calculating a potential economic value for at least one of the plurality of data assets based at least in part on the at least one economic driver category linked to said at least one of the plurality of data assets.

\* \* \* \* \*